(No Model.)
G. P. RICHARDSON.
Band Tie.
No. 231,100.          Patented Aug. 10, 1880.
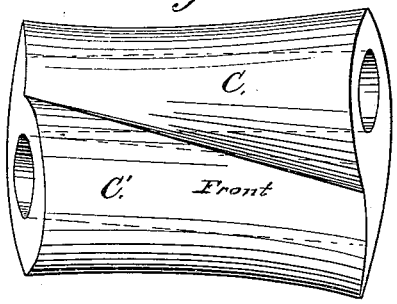
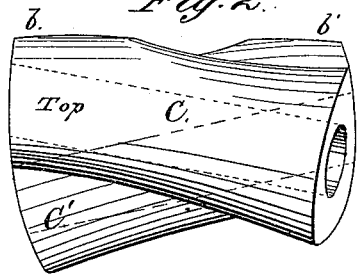
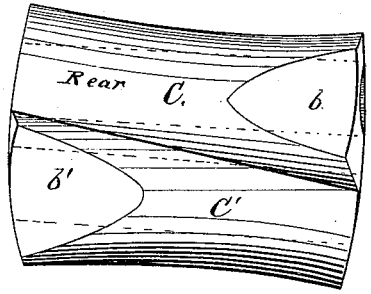
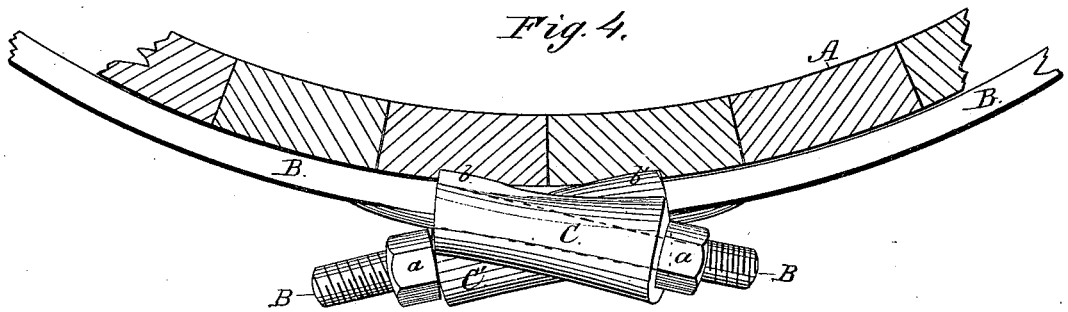
WITNESSES:
W. W. Hollingsworth
Edw. W. Byrn.
INVENTOR:
G. P. Richardson
BY 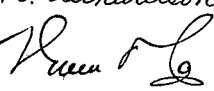
ATTORNEYS.

UNITED STATES PATENT OFFICE.

GILMAN P. RICHARDSON, OF BATH, MAINE.

BAND-TIE.

SPECIFICATION forming part of Letters Patent No. 231,100, dated August 10, 1880.

Application filed June 8, 1880. (No model.)

*To all whom it may concern:*

Be it known that I, GILMAN P. RICHARDSON, of Bath, in the county of Sagadahoc and State of Maine, have invented a new and Improved Band-Tie; and I do hereby declare that the following is a full, clear, and exact description of the same, reference being had to the accompanying drawings, forming part of this specification, in which—

Figure 1 is a side, Fig. 2 a top, and Fig. 3 a rear, view of the tie. Fig. 4 is a view of the same applied to a tub or tank for the purpose of securing the ends of the band or hoop which holds the staves in place.

My invention is designed to provide an improved means for fastening together the ends of the metal bands which serve to bind together the staves of large tanks, barrels, hogsheads, or tubs, and which tie or fastening shall be capable of adjustment to increase or diminish the tension on the band.

It consists of a tie made in the form of two strong tubes cast together, with their axes arranged obliquely to each other. Through the tubular openings in the tie the rounded ends of the band are to be projected and then secured upon the opposite sides of the tie by screw-nuts, as hereinafter more fully described.

In the drawings, A represents a portion of the periphery of a circular tank, tub, hogshead, barrel, or other receptacle made of staves, and held together by bands B. C C' is the tie, formed, by casting or otherwise, in the nature of two heavy tubes having their axes arranged obliquely to each other. Through the tubular openings in this tie the ends of the band B are passed, which ends are screw-threaded and secured by nuts a. At the ends of the tubes where the nuts find a bearing the faces of the tubes are made larger than at the other end, so as to give a better bearing for the nuts, and at the other or smaller ends the tubes have cut-away portions b b', so as to cause the tubular opening to be as nearly as possible tangential to the curve of the tank and avoid a bend in the band at this point.

When the tubes are cut away at b b', as shown, and the strain of the band has sunken the inner ends slightly into the wood of the staves, the holes through the tubes are practically tangential to the tank, and the band finds a contact with the staves close up to the tie.

The object in making the tubes of the casting oblique to each other is, first, to throw the end of the tube at the side where the band enters as close as possible to the staves, and, secondly, to throw the opposite side of the tubes out from the curve of the tank, so as to give room for the turning of the nuts. By means of the elongated character of these tubes and their strong connection with each other a great amount of strain may be put upon the band to tighten the same and draw the tank together, and the tension of the band may be regulated at will either to loosen or tighten the same, as circumstances may require.

My invention finds many useful applications; but prominently may be mentioned the large tubs which brewers use, large water-tanks for railroads, and in fact all large vessels which are composed of staves and bound together by encompassing bands.

Having thus described my invention, what I claim as new is—

1. A band-tie composed of two obliquely-arranged tubes formed in one piece, as described.

2. A band-tie composed of two obliquely-arranged tubes formed in one piece and having one end face of each tube made larger than its other end face, as and for the purpose described.

3. A band-tie composed of two obliquely-arranged tubes formed in one piece and having cut-away portions b b' at their inner ends, as described.

4. The combination, with a band having screw-threaded ends, of a tie composed of two obliquely-arranged tubes formed in one piece and nuts a, for securing the ends of the bands in the tie, substantially as described.

GILMAN PIERCE RICHARDSON.

Witnesses:
JOSEPH M. TROTT,
GEO. P. DAVENPORT.